(12) United States Patent
Kozenski et al.

(10) Patent No.: US 9,249,346 B2
(45) Date of Patent: Feb. 2, 2016

(54) SOLIDS PASSIVATION

(71) Applicant: Dow Corning Corporation, Midland, MI (US)

(72) Inventors: Christopher Kozenski, Prattville, AL (US); David Miller, Madison, IN (US)

(73) Assignee: Dow Corning Corporation, Midland, MI (US)

( * ) Notice: Subject to any disclaimer, the term of this patent is extended or adjusted under 35 U.S.C. 154(b) by 366 days.

(21) Appl. No.: 13/826,381

(22) Filed: Mar. 14, 2013

(65) Prior Publication Data

US 2013/0193372 A1 Aug. 1, 2013

Related U.S. Application Data

(63) Continuation-in-part of application No. 12/864,705, filed as application No. PCT/US2009/033619 on Feb. 10, 2009, now abandoned.

(60) Provisional application No. 61/034,233, filed on Mar. 6, 2008.

(51) Int. Cl.
*C09K 3/00* (2006.01)
*B09B 3/00* (2006.01)

(52) U.S. Cl.
CPC .............. *C09K 3/00* (2013.01); *B09B 3/0041* (2013.01)

(58) Field of Classification Search
CPC ....... B09B 3/0041; C09K 3/00; C04B 33/132
See application file for complete search history.

(56) References Cited

U.S. PATENT DOCUMENTS

| 4,724,122 A | 2/1988 | Hosokawa |
| 4,824,652 A | 4/1989 | Hosokawa |
| 7,101,821 B2 | 9/2006 | Demes et al. |

*Primary Examiner* — Shuangyi Abu Ali
(74) *Attorney, Agent, or Firm* — Catherine U. Brown

(57) ABSTRACT

The invention pertains to a method of passivating direct process solids and to passivated and quenched compositions resulting from said method. The method of passivating direct process solids according to the invention comprises combining direct process solids with a passivating composition comprising clay, base, and water. The passivated composition of the invention comprises direct process solids and a passivating composition comprising clay, base, and water. The quenched composition of the invention comprises the passivated composition, wherein the passivated composition has been held for a sufficient period of time for the reactive species from the direct process solids to be substantially quenched and/or oxidized.

11 Claims, No Drawings

SOLIDS PASSIVATION

CROSS-REFERENCE TO RELATED APPLICATIONS

This application is a continuation in part of U.S. patent application Ser. No. 12/864,705, filed on Feb. 10, 2009 and claims priority thereto under 35 U.S.C. §120 and 35 U.S.C. §365(c). U.S. patent application Ser. No. 12/864,705 is hereby incorporated by reference.

BACKGROUND OF THE INVENTION

Organohalosilanes, halosilanes, and in particular methylchlorosilanes, are the building blocks from which silicone polymers are produced. Organohalosilanes and halosilanes are commercially produced by what is commonly called "the direct process", in which silicon metal is reacted with an organic halide or hydrogen chloride, optionally in the presence of a catalyst. Various aspects of the direct process are well known in the art, and have been described in patent literature.

In, for example, the commercial production of methylchlorosilanes by the direct process, finely ground silicon metal powder is reacted with methyl chloride in the presence of a catalyst by fluidizing the silicon powder in a fluid bed by passing methyl chloride gas through at a temperature of between 200° C. and 500° C. At the end of the reaction, there remains in the fluid bed, solids material. Similar steps are taken and similar direct process solids material is produced when manufacturing halosilanes.

In the commercial production of methylchlorosilanes, after the removal of the methylchlorosilanes from the fluid bed reactor, the direct process solids material remaining in the fluid bed reactor comprises mainly silicon metal and silicon oxides with minor amounts of other materials such as catalyst, unreacted organic halide, carbon residues, impurities and reaction product.

It is well known that direct process solids material can be hazardous if left in an unpassivated state. When in contact with moisture, such as atmospheric moisture, it evolves hydrogen gas, and it is highly susceptible to atmospheric oxidation and self-heating, which represents a potential fire hazard. Consequently, methods have been developed to passivate direct process solids. One such method is through quenching by reaction with an alkaline substance such as an aqueous lime solution. However, this method requires long reaction times, energy to heat the reaction, and subsequent separation steps to remove metals such as silicon, copper, zinc and aluminum. These negatives, along with the added large amount of water that remains after the reaction, make this process expensive. Another method of passivating direct process solids is to mix the direct process solids material with clay; however, this method increases the amount of waste generated, and the direct process solids material is still active for a period after mixing with the clay. Examples of quenching and/or passivating methods are described in U.S. Pat. No. 5,000,934 (Dow Corning); Russian Patent No. 2118561 (State Scientific Centre of the Russian Federation); and US Patent Application Publication U.S. 2004/0029713.

The present inventors have found that direct process solids may be passivated using a mixture of clay, water, and base. The method has economic advantages such as reducing waste, equipment maintenance, labor, raw material costs, and the amount of passivating and inert compounds present from the clay. Reducing the inert materials also results in an increased amount of valuable copper in the final material, because the copper from the direct process solids is less diluted by the inert material. In addition to the economic benefits, the new method also improves other properties of the resulting material. The new method reduces the passivated product's dustiness by improving its ability to be rewet. It reduces the environmental, health and safety concerns of neutralizing the activity of the direct process solids, and it requires less quenching time and improves the consistency of the clay-direct process solids compositions.

BRIEF SUMMARY OF THE INVENTION

The invention pertains to a method of passivating direct process solids and to passivated and quenched compositions resulting from said method. The method of passivating direct process solids according to the invention comprises combining direct process solids with a passivating composition comprising clay, base, and water. The passivated composition of the invention comprises direct process solids and a passivating composition comprising clay, base, and water. The quenched composition of the invention comprises the passivated composition, wherein the passivated composition has been held for a sufficient period of time for the reactive species from the direct process solids to be substantially quenched and/or oxidized.

DETAILED DESCRIPTION OF THE INVENTION

The following definitions are presented to help clarify and explain the invention.

As used herein, "active" is intended to mean, in relation to direct process solids, self-heating or, in the case where the direct process solids has been passivated, direct process solids which still contain a substantial number of reactive species. A substantial number of reactive species means that the direct process solids are still capable of undergoing oxidative reactions with water or atmospheric oxygen. Typically, a substantial number means greater than 10% of the starting number of reactive species.

As used herein, "dry" is intended to mean free or relatively free from a liquid and especially water. "Relatively free from" means that there may be some liquid or water present. For example, in one embodiment, "relatively free from" means that there is <2 weight % water, based on the weight of the substance; in another embodiment, <1 weight % water, based on the weight of the substance; and in another embodiment, <0.5 weight % water, based on the weight of the substance.

As used herein, "equivalent weight" means, with respect to a base, the quantity, in grams, that would furnish one gramionic weight of hydroxyl ion (17.008 grams) if the base were completely ionized. Therefore, the equivalent weight of lime is its molecular weight divided by two, and the equivalent weight of sodium hydroxide is equal to its molecular weight.

As used herein, the "equivalents of base per 100 grams of direct process solids" is calculated by dividing the weight in grams of base combined by the equivalent weight of the base, followed by dividing by the amount of direct process solids combined and multiplying by 100.

For example, if 7.05 grams of lime are added to 100 grams of direct process solids with 40 grams of water, the equivalents of lime per 100 grams of spent bed are calculated as follows:

$$((7.05 \text{ g Lime}/28.03 \text{ grams per equivalent lime})/100 \text{ grams of direct process solids}) \times 100 = 0.25 \text{ equivalents per 100 grams of direct process solids}.$$

As used herein, "to passivate" is intended to mean to make direct process solids that are self-heating no longer self-heating or part of a composition that is not self-heating.

As used herein, "neat" is intended to mean without admixture or dilution.

As used herein, "quenching" is intended to mean substantially arresting or completing the oxidation reactions of the reactive species in direct process solids by chemical means or physical means. Substantially arresting or completing is intended to mean when the oxidative and/or reactive species reactivity or availability has been reduced below the point where the direct process solids will undergo oxidative reactions. Typically, the oxidative and/or reactive species have been substantially reduced when they are below 10% of their initial activity in the direct process solids.

As used herein, "slurry" is intended to mean a mixture of aqueous phase and insoluble material.

The definitions herein provided are intended to encompass other grammatical forms of the terms defined according to normal grammatical usage. For example, a definition of the singular term is meant to include the plural, and a definition of the present tense is meant to include the past, as well as the other tenses.

The passivated and quenched compositions of the invention result from the method of the invention. The method comprises passivating direct process solids by combining direct process solids with a passivating composition comprising clay, base, and water.

The passivated and quenched compositions of the invention comprise direct process solids and/or are formed from direct process solids. Direct process solids are also known in the art as spent bed. Direct process solids according to the invention are the residual materials in a fluid bed reactor resulting from the reaction of silicon metal with an organic halide or hydrogen chloride in a fluid bed with any other typical reactants and/or catalysts in the manufacture of organohalosilanes and/or halosilanes in a direct process reaction. For example, the direct process solids may contain catalyst such as copper, unreacted organic halide, metals such as silicon, copper, zinc, and aluminum, silicone oxides, carbon residues, impurities and reaction product. Typical direct process solids material comprises mainly silicon metal and silicon oxides, and minor amounts of copper catalyst, iron, carbon, aluminum chloride, methyl chloride, and chlorosilanes and/or polysilanes. "Direct process solids" as used according to the invention is intended to include direct process solids which are active or partially active.

The amount of direct process solids combined to form the passivated and/or quenched compositions may vary depending upon the reactivity of the direct process solids. One skilled in the art would know how to determine the amount of direct process solids to use in forming the passivated and/or quenched compositions by, for example, conducting a self-heating test. One skilled in the art would also know how to adjust the amount of direct process solids combined to form the passivated and/or quenched compositions according to the invention. In one embodiment, the amount of direct process solids combined is from 10 to 90 weight % of the passivated composition; in another embodiment, from 20 to 80 weight %; in another embodiment from 30 to 70 weight %; and, in another embodiment, from 40 to 60 weight %. The limits on the amount of direct process solids combined to form the passivated and quenched compositions are the points at which the passivated composition becomes self-heating or the consistency of the passivated and/or quenched composition becomes unacceptable. An unacceptable consistency is when the passivated composition is the consistency of a paste or of a lesser viscosity, or when, after drying, it is too powdery and easily broken apart or crumbled.

In one embodiment, the direct process solids have not been treated prior to being combined with the passivating composition; in another embodiment the direct process solids have been treated prior to being combined with the passivating composition. For example, the direct process solids may be treated with aqueous base, air, or a combination of aqueous base and air prior to combining with the passivating composition and/or remaining materials of the passivating composition. Where the direct process solids are treated prior to combining with the passivating composition, the direct process solids are not treated such that the direct process solids are quenched prior to combining with the passivating composition.

The passivated and/or quenched compositions comprise those resulting from combining direct process solids with the passivating composition. With the proviso that direct process solids and passivating composition always add to 100 weight % minus any incidental ingredients present in the passivated composition, the amount of passivating composition combined to form the passivated and/or quenched compositions of the invention may vary. One of ordinary skill in the art would know how to vary the amount of passivating composition added to form the passivated and quenched composition. Also, one with skill in the art would also know how to determine the amount of passivating composition to combine to form the passivated and/or quenched compositions of the invention by, for example, conducting a self-heating test and by monitoring the consistency of the resulting passivated composition. In one embodiment, the amount of passivating composition combined is from 10 to 90 weight % of the passivated composition; in another embodiment, from 20 to 80 weight %; in another embodiment from 30 to 70 weight %; in another embodiment, from 40 to 60 weight %.

The passivated and/or quenched compositions of the invention may contain incidental ingredients such as dyes, pigments, colors, emulsifiers, buffers, and rheology modifiers. Incidental ingredients may be present in the passivated and/or quenched compositions of the invention from 0 to 5 weight %.

The passivating composition of the invention comprises clay, base and water. The clay may be any of the forms of hydrated alumino silicates, for example, those hydrated alumino silicates of general formula $Al_2O_3SiO_2 \cdot xH_2O$, where x is the degree of hydration; and clay substitutes. Specific examples of clays useful in the present invention include Fuller's Earth, bentonite, kaolin (China clay), diatomite. Alternatively, the clay may be a clay substitute. Exemplary clay substitutes are fly ash, alumina dust (alumina oxide), manganese oxide, alkali silicates such as $Li_4SiO_4$, $Na_2Si_4O_9 \cdot xH_2O$, $K_2SiO_3$, $K_2SiO_5$, and alkali earth silicates such as $CaSiO_3$ and $BaSiO_3$. In one embodiment, the clay is Fuller's Earth, bentonite, kaolin, diatomite, fly ash, alumina dust, an alkali silicate, or an alkali earth silicate; in another embodiment, the clay is any of the forms of hydrated alumino silicates, for example, those hydrated alumino silicates of general formula $Al_2O_3SiO_2 \cdot xH_2O$, where x is the degree of hydration; in another embodiment, the clay is Fuller's Earth, bentonite, kaolin, or diatomite; and in another embodiment, the clay is bentonite. Alternatively, the clay may be a hydrated alumino silicate, such as bentonite, kaolin, diatomite, or fly ash.

The amount of clay in the passivated compositions can vary depending on the activity of the direct process solids material to be passivated, the type of clay employed, and the desired consistency of the passivated and/or quenched composition. One skilled in the art would know how to determine the amount of clay to combine by, for example, conducting a self-heating test and by monitoring the consistency of the passivated composition created. In one embodiment, the clay is from 0.15 weight % to 60 weight % of the passivated compositions of the invention; in another embodiment, from 1 to 46 weight %; in another embodiment, from 1 to 40 weight %; in another embodiment, from 1 to 25 weight %; in another embodiment, from 2 to 20 weight %; in another embodiment, from 2.5 to 20 weight %; in another embodiment, from 5 to 18 weight %; in another embodiment, from 0.15 weight % to 46 weight %; in another embodiment, from 0.15 weight % to 40 weight %; in another embodiment, from 0.15 weight % to 25 weight %; in another embodiment, from 0.15 weight % to 20 weight %; in another embodiment, from 0.15 weight % to 18 weight %; and in yet another embodiment, from 6 to 18 weight %.

The weight ratio of clay to direct process solids material (Clay:DPS Ratio) combined to form the passivated and/or quenched compositions can vary. One skilled in the art would know how to vary the clay in proportion to direct process solids and how to determine the amount of clay to combine in relation to the amount of direct process solids by, for example, conducting a self-heating test, as described below, and by monitoring the consistency of the passivated composition created. In one embodiment, the clay to direct process solids weight ratio combined to form the passivated and/or quenched compositions is ≥0.01:1; in another embodiment, ≥0.05:1; in another embodiment, from 2:1 to 0.01:1; in another embodiment, from 1:1 to 0.04:1; in another embodiment from 1:1 to 0.05:1; in another embodiment, from 1:1 to >0.05:1; in another embodiment, from 1:1 to 0.06:1; in another embodiment, from 0.8:1 to 0.05:1; in another embodiment, from 0.46:1 to 0.06:1; in another embodiment, from 0.20:1 to 0.06:1; in another embodiment, from 0.15:1 to 0.05:1; and in another embodiment, from 0.46:1 to 0.01:1. The practical limits of the ratio of clay to direct process solids are the points the passivated composition is no longer non-self-heating or the consistency becomes unacceptable.

The passivating composition also comprises a base. As used herein, "base" is intended to mean a chemical species or molecular entity having an available pair of electrons capable of forming a covalent bond with a hydron (proton) or with a vacant orbital of some other chemical species and includes Bronsted and Lewis bases. Examples of bases useful in the present invention include alkali oxides such as $Li_2O$, $Na_2O$, $K_2O$, $Rb_2O$, $Cs_2O$, alkali hydroxides such as LiOH, NaOH, KOH, RbOH, and CsOH, alkali earth oxides such as CaO and BaO, alkali earth hydroxides such as $Ca(OH)_2$ and $Ba(OH)_2$, ammonium hydroxide, alkali silicates such as $Li_4SiO_4$, $Na_2Si_4O_9.xH_2O$, $K_2SiO_3$, $K_2SiO_5$, alkali earth silicates such as $CaSiO_3$ and $BaSiO_3$, alkali borates such as $Li_2B_4O_7.5H_2O$, $Na_2BO_2$, $Na_2B_4O_7$, $Na_2B_4O_7.10H_2O$, $Na_2B_4O_2$, $Na_2B_4O_4.xH_2O$, and alkali earth borates such as $Ca(BO_2)_2.2H_2O$ and $BaB_2O_4.7H_2O$. Alternatively, the base may be an alkali earth carbonate, such as $CaCO_3$, $MgCO_3$, $CaMg(CO_3)_2$ (dolomite), or an alkali carbonate such as $Na2CO3$ and $K_2CO_3$. In one embodiment, the base is lime (CaO). One skilled in the art would recognize that certain clay substitutes, such as alkali silicates and alkali earth silicates may also be used as bases. However, the clay and the base are distinct ingredients in the passivating composition. When an alkali silicate is selected as the base, then the clay is not an alkali silicate; when an alkali earth silicate is selected as the base, then the clay is not an alkalki earth silicate. Furthermore, one skilled in the art may recognize that certain naturally occurring clays may contain amounts of base that contribute to the total amount of base added to the passivating composition.

The amount of base combined to form the passivated and quenched compositions may vary. The limits on the addition of base are the practical limits of reducing raw material costs, achieving the desired consistency of the composition, and reducing the time to passivate and/or quench the direct process solids. One skilled in the art would know how to adjust the amount of base combined to form the passivated and quenched compositions and how to determine the amount of base to passivate and/or quench the direct process solids by, for example, conducting a self-heating test or by determining the time required for the passivated composition to reach ambient temperature. The amount of base combined to form the passivated and quenched compositions of the invention may be expressed in terms of the equivalents of base combined per 100 grams of direct process solids (Base Eq: DPS Ratio). In one embodiment of the invention, ≥0.03 equivalents of base per 100 grams of direct process solids are combined to form the passivated and or quenched compositions; in another embodiment, ≥0.04 equivalents of base per 100 grams of direct process solids are combined to form the passivated and/or quenched compositions; in another embodiment, ≥0.05 equivalents of base per 100 grams of direct process solids are combined to form the passivated and/or quenched compositions; in another embodiment, ≥0.10 equivalents of base per 100 grams of direct process solids are combined; in another embodiment, ≥0.18 equivalents of base per 100 grams of direct process solids are combined; in another embodiment, ≥0.20 equivalents of base per 100 grams of direct process solids are combine; in another embodiment, ≥0.05 to 4.0 equivalents of base per 100 grams of direct process solids are combined; in another embodiment, ≥0.10 to 3.0 equivalents of base per 100 grams of direct process solids are combined; in another embodiment, from ≥0.18 to 3.0 equivalents of base per 100 grams of direct process solids are combined; in another embodiment, ≥0.28 to 3.0 equivalents of base per 100 grams of direct process solids are combined.

The amount and strength of the base affect the amount of clay required to passivate active direct process solids. With more and/or stronger base, less clay is required to passivate the same amount of active direct process solids. Therefore, the stronger the base the lower the ratio of clay to direct process solids required in order to passivate the direct process solids and improve product handling, assuming all other conditions remain the same. Similarly, when a weaker base is used, more clay may be used to passivate the directed process solids, assuming all other conditions remain the same. The amounts of clay and base can be selected such that a sum of the ratio of equivalents of base per 100 g direct process solids and the ratio of clay to direct process solids is greater than or equal to 0.35, i.e., (Base Eq: DPS Ratio+Clay: DPS Ratio) ≥0.35. Alternatively, (Base Eq: DPS Ratio+Clay: DPS Ratio) ≥0.40; alternatively (Base Eq: DPS Ratio+Clay: DPS Ratio) ≥0.45; alternatively (Base Eq: DPS Ratio+Clay: DPS Ratio) ≥0.50; alternatively (Base Eq: DPS Ratio+Clay: DPS Ratio) ≥0.55; alternatively (Base Eq: DPS Ratio+Clay: DPS Ratio) ≥0.60; and alternatively 0.10≥(Base Eq: DPS Ratio+Clay: DPS Ratio)≥0.60. Without wishing to be bound by theory, it is thought that the present process can optimize the amounts of clay and base such that a minimum amount of each is used, thereby providing one or more economic advantages such as reducing waste, equipment maintenance, labor, raw material costs, and the amount of passivating and inert compounds present from the clay; and increasing the concentration of copper in the passivated and/or quenched composition, because the copper from the direct process solids is less diluted by the inert material.

The clay, direct process solids, and base account for at least 50 weight %, in another embodiment at least 60 weight %, in another embodiment at least 70 weight %, and in another embodiment up to 90 weight % of the passivated and/or quenched compositions. The remainder of the composition is made up of water and any incidental ingredients.

The passivating composition of the invention comprises water. On skilled in the art would know how to combine the water with the other ingredients according to the invention and how to determine the amount of water that should be combined by conducting, for example, a self heating test or monitoring the consistency of the passivated composition produced. Water is combined with the other ingredients of the passivated composition to control the consistency of the passivated composition and to enable the reactive components of the passivated composition to react. In one embodiment, the passivated compositions contain water from 10 to 40 weight %, in another embodiment from 15 to 40 weight %, in another embodiment from 15 to 35 weight %, and in yet another embodiment from 18 to 34 weight % of the passivated composition. The water can be incorporated either by separate addition and/or by having some or all of the clay and/or base added to form the composition in the form of a water slurry rather than added dry. In one embodiment, the clay, direct process solids, and base are all combined dry and the water is added independently. The passivated composition becomes the quenched composition. While the quenched composition is forming from the passivated composition and/or after the quenched composition has formed, moisture may be driven off or evaporate so the weight % of moisture in the quenched compositions may be less than that of the passivated compositions. Also, the quenched composition may be further heated and/or dried to remove substantially all of the moisture from that in the passivated composition forming the quenched composition.

The passivated and/or quenched compositions are not self-heating. A composition is considered to be non-self-heating with the context of the present invention when it satisfies the provisions laid down by the European ADR Division 4.2 test for dangerous goods ("Recommendations on the Transport of Dangerous Goods, Manual of Tests and Criteria", (1995), United Nations, New York and Geneva, ISBN92-1-139049-4). Briefly, a 4-inch cube of the direct process solids and clay mixture is baked in a 140° C. oven and the cube temperature monitored for 24 hours. If the rise in temperature of the cube is less than 60° C. above the baking temperature, (i.e., it stays below 200° C.), it is considered non-self-heating.

The direct process solids are passivated according to the invention when mixed with the passivating composition. Therefore, passivation of the direct process solids occurs quickly when the passivated composition of the invention is formed. However, even though passivated after mixing with the passivating composition, the direct process solids may still remain active for a period of time thereafter. That is, the reactive species from the direct process solids may still undergo substantial oxidation reactions with moisture and/or atmospheric oxygen for some period of time after the passivated composition is formed and until substantially all the reactive species from the direct process solids have been substantially oxidized or quenched. After this point of substantial oxidation, the passivated composition has become the quenched composition. Therefore, to form the quenched composition, the passivated composition is formed and held for sufficient time until this point of substantial oxidation and/or quenching of the direct process solids. "Holding" or "held" as used herein is intended to mean, in relation to the passivated and/or quenched composition, to let time pass and is intended to refer to the time between the formation of the passivated composition and the formation of the quenched composition. Holding may be performed at ambient temperature, e.g., room temperature of 25° C. Alternatively, holding may be performed at elevated temperature, e.g., up to 200° C.; alternatively up to 150° C.; alternatively 25° C. to 200° C.; and alternatively 25° C. to 150° C.

The oxidation or quenching process of the direct process solids reactive species generates heat, and, therefore, the temperature of the passivated composition is an indication of the progression of the oxidation process. After the passivated composition is formed, the oxidation reactions generate heat and will keep the passivated composition above ambient temperature. However, once the direct process solids' reactive species have substantially ceased to be reactive, heat will no longer be generated, and the heat already generated will dissipate. This will cause the quenched composition's temperature to equilibrate with the surrounding temperature. Therefore, the point when the passivated composition of the invention reaches ambient temperature is related and proportional to the time that the direct process solids reactive species have become substantially oxidized or quenched and that the passivated composition has become the quenched composition of the invention. Therefore, this process provides the benefit that a passivated and/or quenched composition may be formed without addition of heat from an external source, i.e., any temperature increase in this process is caused by heat from exothermic reaction of the ingredients of the passivating composition; there is no calcining step or other heating step used to passivate and/or quench the composition. Without wishing to be bound by theory, the process described herein may be performed under conditions that do not exceed 300° C., alternatively conditions that do not exceed 200° C., alternatively conditions that do not exceed 150° C., and alternatively conditions that do not exceed 140° C., and alternatively conditions of 25° C. to 140° C.

The time for the quenched composition to form may vary depending upon the reactivity of the direct process solids in the passivated composition, the amount and strength of the base, the temperature at which the passivated composition is held, the ratio of the components comprising the passivated composition, and the amount of passivated composition since large bulk material will generally dissipate heat at a lower rate than small amounts of material. In one embodiment, the passivated composition reaches ambient temperature in <19 days; in another embodiment, <14 days; in another embodiment, in <8 days; and in another embodiment, in <7 days.

Advantages are associated with the passivated and quenched compositions. For example, the passivated compositions can passivate direct process solids using less clay than compositions containing only direct process solids, clay and water. This leads to the benefits of having less inert material in the passivated composition. Since there is less inert material that is added to the direct process solids, the levels of valuable copper from the catalyst is higher in the final passivated composition product. There is also less inert material to buy and then process downstream. Therefore, the passivated composition product may contain up to 40% inert material, i.e., the passivated composition may contain at least 60% direct process solids. The passivated composition may have a clay to DPS ratio of ≤0.67:1.

The passivated and/or quenched compositions also have the benefit of having better consistency than compositions formed from only direct process solids, clay, and water. The consistency is better because, it is believed, the base reacts with the clay to form a weak mortar. This mortar holds its form better than the corresponding mixtures of only clay, water, and direct process solids, improving product handling. Consistency of the passivated and/or quenched compositions is determined by visual observation for stickiness and agglomerate size when wet, and for stability, such as resistance to crumbling, when dry.

The passivated and quenched compositions can be incorporated into a wide variety of ceramics. However, particularly useful ceramics to which the passivated and/or quenched compositions can be included are, for example, structural clay products (bricks, tiles, terra cotta, architectural bricks), whitewares (dinnerware, chemical and electrical porcelain), porcelain enamels, refractories (materials that withstand high temperatures), as micronutrient fertilizers and animal feeds, or recycled in a smelting operation to reclaim select metals. Even more particularly, ceramics such as roofing panels, masonry bricks, cladding bricks, pavers, wafer bricks, boardings and ducts can benefit from the compositions.

The present invention also provides a method of passivating and quenching direct process solids material comprising mixing direct process solids with a passivating composition comprising a clay, water, and a base. The method of passivating and/or quenching direct process solids material produces the passivated and quenched compositions.

In the combining step, the direct process solids and passivating composition may be simply mixed together using any suitable mixing equipment, for example a static mixer, a pan mill, and extruder or a finger mixer pug mill. In one embodiment, an extruder is used to mix the direct process solids and passivating composition. When using an extruder it is crucial that the passivating composition contain water, suitably in the amounts given above. In one embodiment, when using an extruder, the direct process solids material, base and clay are pre-mixed and at least some water, and in one embodiment a substantial amount of the final water in the composition, is added and mixed into the pre-mix prior to the composition being introduced into the extruder. The water can be introduced separately and/or via the use of a clay or base slurry. When using an extruder to mix the compositions, water contents from 10 to 40 weight %, from 15 to 35 weight %, and from 18 to 34 weight %, based upon the weight of the passivated composition, have been found to be suitable.

The advantage of an extrusion process is that the final passivated composition product can be obtained in the form of billets or pieces, which are easy and convenient to handle and store. Any incidental ingredients, such as colors, pigments or rheology modifiers, may be supplied to the process using any suitable equipment such as, for example, screw feeders, weigh belt feeders and vibratory feeders. The incidental ingredients may be incorporated into the extruded billets or pieces by feeding the additives upstream of the extrusion process, or they may be combined with the billets after the extruder as suits the specific application.

The combining of the material can be done in essentially any order provided adequate mixing is employed to ensure sufficient contact of the direct process solids and passivating composition and provided that the base is not contacted with the direct process solids such that the direct process solids are passivated prior to combining with the other materials to form the passivated composition. One skilled in the art would know how to select the type of mixing to provide enough homogeneity to the resulting passivated composition containing the direct process solids. In one embodiment, the dry materials are mixed together first followed by the wet; in another embodiment, the clay and water are mixed together followed by the other materials; and in yet another embodiment, all materials are combined at one time. In addition, the passivating composition may be pre-mixed and then combined with the direct process solids directly as one passivating composition, or the passivating composition may be combined with the direct process solids as separate ingredients one at a time, or in combination with any of the other materials to be combined and then combined with the direct process solids.

The base may be combined with the direct process solids, with the other ingredients of the passivating composition or may be added to the direct process solids separately. The base may be combined with the direct process solids or the other ingredients of the passivating composition neat, dissolved, suspended, emulsified, or as a slurry in water or solvent. In one embodiment, the base is formed into a water slurry and combined with the direct process solids separate from the clay; in another embodiment, the base is in a water slurry and is combined with the clay prior to combining with the direct process solids; in another embodiment, the base is in a water slurry and combined with the clay and the direct process solids at the same time; and in yet another embodiment, the base is in a water slurry and added to the premixed clay and direct process solids. There is really no limit upon the order of combination of the base with the other ingredients of the passivated composition except that the base is not added to the direct process solids such that the direct process solids are passivated or quenched prior to combining with the other ingredients of the passivating composition.

EXAMPLES

The following examples are included to demonstrate different embodiments of the invention. It should be appreciated by those of skill in the art that the techniques disclosed in the examples which follow represent techniques discovered by the inventor to function well in the practice of the invention, and thus can be considered to constitute modes for its practice. However, those of skill in the art should, in light of the present disclosure, appreciate that many changes can be made in the specific embodiments which are disclosed and still obtain a like or similar result without departing from the spirit and scope of the invention. Unless otherwise noted, all percentages are in weight percent (%).

Example 1

Passivation of Direct Process Solids Material

Batches of direct process solids and passivating composition were made varying the amount of clay, base, and water. The batches were prepared as follows. The clay (Kaolin), direct process solids, water and base were measured into a beaker and mixed by hand with a metal stirrer until well mixed. The base as used in the examples was first dissolved and/or diluted with water or made into a water slurry. This water was accounted for in the final water as listed for each batch in the examples below. The batches were then tested for self-heating test according to the "Recommendation on the transport of Dangerous Goods, Manual of Test and Criteria", (1995), United Nations, New York and Geneva, ISBN92-1-139049-4, by forming into 4-inch cubes, baking the cubes in an 140° C. oven and monitoring the temperature of the cubes for 24 hours. Cube compositions that rise in temperature to over 200° C. in the test are considered to be self-heating. In Table 2, a "pass" rating for self-heat result is a batch that did not rise in temperature to above 200° C. in the self-heating test, whereas a batch with a "fail" rating did. The batches were also tested after initially made for consistency by visual observation based on agglomerate size and tendency to stick to the glass and metal stirrer and, after baked dry in the oven for the self-heating test, for dusting while stirring and shaking and for the force to manually break apart the agglomerates. The ingredient percentages and the results of their testing are listed in tables 1, 2, and 3 below. The key for the evaluation of passivated and quenched composition consistency is 1—unacceptable (either powder or paste); 3—comparable to acceptable clay passivated direct process solids produced without base; 9—noticeable improvement compared to direct process solids passivated with clay and water and no base. A rating between 1 and 3 indicates a consistency that is not unacceptable but is not comparable to that of clay passivated direct process solids produced without base. A rating between 3 and 9 is a consistency better than that of clay passivated direct process solids produced without base but not a noticeable improvement compared to direct process solids passivated with clay and water and no base.

TABLE 1

Weight of direct process solids, clay, lime, and water combined for each batch.

| Batch | Wt. Direct process solids (grams) | Wt. Clay (grams) | Wt. Lime (grams) | Wt. Water (grams) | Equivalents of Base per 100 g Direct Process Solids |
|---|---|---|---|---|---|
| 1 | 200 | 0 | 0 | 0 | 0 |
| 2 | 90 | 0 | 8.25 | 46.75 | 0.33 |
| 3 | 100 | 10 | 7.05 | 40.0 | 0.25 |
| 4 | 98 | 19.9 | 6.15 | 34.9 | 0.22 |
| 5 | 99.4 | 0 | 0 | 0 | 0 |
| 6 | 99.6 | 5 | 10.52 | 59.59 | 0.38 |
| 7 | 99.7 | 15 | 3.86 | 73.05 | 0.14 |
| 8 | 99.6 | 5 | 1.32 | 24.98 | 0.05 |
| 9 | 100 | 5 | 3.95 | 22.36 | 0.14 |
| 10 | 100 | 15 | 11.51 | 65.20 | 0.41 |
| 11 | 100 | 10 | 4.71 | 42.39 | 0.17 |
| 12 | 100 | 5 | 3.50 | 66.51 | 0.12 |
| 13 | 100 | 10 | 4.71 | 42.39 | 0.17 |
| 14 | 100.1 | 10 | 4.71 | 42.39 | 0.17 |
| 15 | 100 | 15 | 1.44 | 27.36 | 0.05 |
| 16 | 100 | 15 | 4.32 | 24.48 | 0.15 |
| 17 | 100 | 0 | 0 | 0 | 0 |
| 18 | 100 | 10 | 10.00 | 27.00 | 0.35 |
| 19 | 100 | 70 | 0.00 | 77.00 | 0 |
| 20 | 100 | 5 | 10.00 | 28.70 | 0.35 |
| 21* | 100 | 5 | 1.00 | 39.00 | 0.03 |
| 22* | 100 | 5 | 5.00 | 20.00 | 0.13 |
| 23* | 100 | 5 | 10.00 | 51.10 | 0.25 |
| 24* | 100 | 0 | 10.00 | 0 | 0.25 |

*Sodium hydroxide substituted for lime in these batches. Therefore, the weight lime in the table for these batches refers to the weight in grams of sodium hydroxide added. The sodium hydroxide was diluted in water prior to addition, but the weight indicated under "weight lime" in Table 1 does not include the weight of any water added with the sodium hydroxide.

TABLE 2

Ratio of clay and lime to direct process solids, ratio combined, % water and self-heating testing results.

| Batch | Ratio Clay:Direct process solids | Sum of Base Eq:DPS Ratio + Clay:DPS Ratio | Ratio Lime:Direct process solids | % Water | Self-Heat Results |
|---|---|---|---|---|---|
| 1 | 0.00 | 0 | 0.00 | 0.0 | Fail |
| 2 | 0.00 | 0.33 | 0.09 | 32.2 | Pass |
| 3 | 0.10 | 0.35 | 0.07 | 25.4 | Pass |
| 4 | 0.20 | 0.42 | 0.06 | 21.9 | Pass |
| 5 | 0.00 | 0 | 0 | 0.0 | Fail |
| 6 | 0.050 | 0.43 | 0.106 | 34.1 | Fail |
| 7 | 0.150 | 0.29 | 0.04 | 38.1 | Fail |
| 8 | 0.050 | 0.10 | 0.01 | 19.1 | Fail |
| 9 | 0.050 | 0.19 | 0.04 | 17.0 | Fail |
| 10 | 0.150 | 0.56 | 0.115 | 34.0 | Pass |
| 11 | 0.10 | 0.27 | 0.05 | 27.0 | Fail |
| 12 | 0.05 | 0.17 | 0.03 | 38.0 | Fail |
| 13 | 0.10 | 0.27 | 0.05 | 27.0 | Fail |
| 14 | 0.10 | 0.27 | 0.05 | 27.0 | Fail |
| 15 | 0.15 | 0.20 | 0.01 | 19.0 | Fail |
| 16 | 0.15 | 0.30 | 0.04 | 17.0 | Fail |
| 17 | 0.00 | 0 | 0 | 0.0 | Fail |
| 18 | 0.100 | 0.46 | 0.1 | 18.4 | Pass |
| 19 | 0.700 | 0.70 | 0 | 31.2 | Pass |
| 20 | 0.050 | 0.41 | 0.1 | 20.0 | Pass |
| 21* | 0.050 | 0.08 | 0.01 | 26.9 | Pass |
| 22* | 0.050 | 0.18 | 0.05 | 15.4 | No Data |
| 23* | 0.050 | 0.30 | 0.1 | 30.8 | Pass |
| 24 | 0 | 0.25 | 0.10 | 0 | Fail |

*Sodium hydroxide was used in place of lime slurry in batch numbers 19-23.

TABLE 3

Product consistency results.

| Batch | Product Consistency Rating | Product Consistency Rating (After Baking) |
|---|---|---|
| 1 | 1 | 1 |
| 2 | 1 | 1 |
| 3 | 3 | 3 |
| 4 | 3 | 3 |
| 5 | 1 | 1 |
| 6 | 4 | 5 |
| 7 | 5 | 4 |
| 8 | 2 | 2 |
| 9 | 2 | 2 |
| 10 | 4 | 5 |
| 11 | 3 | 3 |
| 12 | 5 | 4 |
| 13 | 3 | 3 |
| 14 | 3 | 3 |
| 15 | 2 | 2 |
| 16 | 2 | 2 |
| 17 | 1 | 1 |

Batch numbers 1-2, 5-9, 11-17, are comparative examples. Batch numbers 3, 4, 10, and 18 are according to the invention. When the ratios of direct process solids to clay and base are within the ranges of the invention, the compositions are not self-heating and have acceptable consistency. Only batches 1-17 were tested from product consistency.

Example 2

In a large-scale continuous process plant trials, Kaolin clay and direct process solids were fed from hoppers to a mixer via a screw conveyor. Direct process solids were added to the screw conveyor via a rotary valve to control the ratio of clay to direct process solids entering the mixer. Lime slurry was pumped from a large tote into the mixer through inlets in the mixer with a two inch double diaphragm pump. The amount of lime slurry added to the mixer was adjusted to achieve the desired product consistency exiting the mixer. Six different ratios of clay to direct process solids were tested and segregated to test for self-heating and to monitor the time for the temperature of the product to return to ambient. Table 4 has the results of the trials for self-heating and days for the product to return to ambient temperature. Trial 25 and 26 were combined for the self-heating and time to return to ambient temperature testing.

TABLE 4

Results of self-heating testing and days to return to ambient temperature test results.

|  | Trial No. | | | | | |
|---|---|---|---|---|---|---|
|  | 25&26 | 27 | 28 | 29 | 30 | 31 |
| Ratio clay:direct process solids | 0.85:1 (T1) and 0.7:1 (T2) combined | 0.6:1 | 0.5:1 | 0.4:1 | 0.3:1 | 0.4:1 |
| Days for product to return to ambient temperature | 18 | 13 | 18 | 6 | 19 | 7 |
| Self-Heat Test | Pass | Pass | Pass | Pass | Fail | Pass |

The results in Table 4 indicate that the process can run at low clay to direct process solids ratios and as the amount of clay is reduced according to the invention, the time to return to ambient temperature also decreases. Ratios as low as 0.4:1 clay to direct process solids were run without failing the self-heating test. With this method of mixing, this mixing equipment, this batch of direct process solids and other material, and with these production batch sizes, only a ratio of 0.3:1 clay to direct process solids failed in the self-heating test. Results likely will improve and get closer to laboratory results with the optimization of parameters such as batch sizes, mixing equipment, throughput rate, and batches of direct process solids.

Example 3

Batches of the composition according to the invention were made in the laboratory on small scale varying the ratio of clay to spent bend. Lime slurry was used as the base and added at varying ratios with the direct process solids. The resulting compositions were evaluated for self-heating and percent water. The results are summarized in Table 5 below:

TABLE 5

Compositions of the invention and their results for self-heating and water content.

|  | Trial 32 | Trial 33 |
|---|---|---|
| Ratio of clay:direct process solids | 0.05:1 | 0.1:1 |
| Ratio lime:direct process solids | 0.1:1 | 0.1:1 |
| Water content | 34 | 18.5 |
| Self-heating test result | Pass | Pass |
| Ratio Base Eqivalents: 100 g direct process solids | 0.36 | 0.36 |
| Sum of Base Eq:DPS Ratio + Clay:DPS Ratio | 0.41 | 0.46 |

The results in Table 4 indicate that the ratio of clay to direct process solids can be reduced to 0.05:1 and the lime to direct process solids ratio reduced to 0.1:1 while producing a composition that is not self-heating. Furthermore, the percentage of water in the final product can be as low as 18.5 percent.

Example 4

In a large-scale continuous process plant trials, clay and direct process solids were fed from hoppers to a mixer via a screw conveyor. Direct process solids were added to the screw conveyor via a rotary valve to control the ratio of clay to direct process solids entering the mixer. Lime slurry was pumped from a large tote into the mixer through inlets in the mixer with a two inch double diaphragm pump. The amount of lime slurry added to the mixer was adjusted to achieve the desired product consistency exiting the mixer. Six different ratios of clay to direct process solids were tested and segregated to test for self-heating. Table 6 has the results of the trials for self-heating.

TABLE 6

Large scale continuous process trials with varying clay to spent bed ratios and water percentages.

|  | Trial 34 | Trial 35 | Trial 36 | Trial 37 | Trial 38 | Trial 39 |
|---|---|---|---|---|---|---|
| Ratio - clay:direct process solids | 0.42:1 | 0.43:1 | 0.41:1 | 0.38:1 | 0.35:1 | 0.43:1 |
| Ratio - lime:direct process solids | 0.05:1 | 0.06:1 | 0.05:1 | 0.03:1 | 0.04:1 | 0.03:1 |
| Water content | 17.24 | 17.55 | 17.40 | 11.84 | 14.76 | 11.93 |
| Self-heating test result | Pass | Pass | Pass | Pass | Pass | Pass |
| Ratio Base Eqivalents:100 g direct process solids | 0.18 | 0.21 | 0.18 | 0.11 | 0.14 | 0.11 |
| Sum of Base Eq:DPS Ratio + Clay:DPS Ratio | 0.60 | 0.64 | 0.59 | 0.49 | 0.49 | 0.44 |

Example 5 (Comparative Example)

In a large-scale continuous process plant trial, clay and direct process solids were fed to a mixer via a screw conveyor. Direct process solids were added to the screw conveyor via a rotary valve to control the ratio of clay to direct process solids entering the mixer. No lime slurry was added, but water was added to achieve the desired product consistency exiting the mixer and was controlled to 16-20 wt. % of the mixer contents. The process was run keeping the ratio of clay to direct process solids above about 0.5:1 and between about 0.5:1 and about 1.2:1. The material exiting the process was combined and an exothermic reaction caused a dangerous temperature rise and the experiment had to be stopped.

Example 6

Batches of direct process solids and passivating composition were made using known clay substitutes, as indicated in the tables, as the clay and varying the amount of clay, base, and water. The batches were prepared and tested as in example 1. The results follow.

In the results, batches 1 and 2 are for comparison and are not examples of the present invention.

TABLE 7

Weight of direct process solids, clay, lime, and water combined for each batch.

| Batch | Wt. Direct process solids (grams) | Clay Substitute | Wt. Clay Substitute (grams) | Wt. Lime (grams) | Wt. Water (grams) | Equivalents of Base per 100 g Direct Process Solids |
|---|---|---|---|---|---|---|
| 1 | 1200 | Fly Ash | 480 | 0 | 430 | 0 |
| 2 | 103 | Manganese Oxide | 103 | 0 | 100 | 0 |
| 3 | 98 | Fly Ash | 40.3 | 7.35 | 41.65 | 0.27 |
| 4 | 106 | Fly Ash | 40.7 | 1.23 | 39.77 | 0.036 |
| 5 | 102 | Fly Ash | 20 | 6.3 | 35.7 | 0.22 |
| 6 | 109 | Manganese Oxide | 11 | 8.55 | 48.5 | 0.27 |

TABLE 8

Ratio of clay and lime to direct process solids, ratio combined, % water and self-heating testing results.

| Batch | Ratio Clay:Direct process solids | Sum of Base Eq:DPS Ratio + Clay:DPS Ratio | Ratio Lime:Direct process solids | % Water | Self-Heat Results |
|---|---|---|---|---|---|
| 1 | 0.40 | 0.40 | 0 | 20.4 | Fail |
| 2 | 1.00 | 1.00 | 0 | 32.7 | Pass |
| 3 | 0.41 | 0.68 | 0.08 | 22.2 | Pass |
| 4 | 0.38 | 0.42 | 0.01 | 21.2 | Fail |
| 5 | 0.20 | 0.42 | 0.06 | 21.8 | Pass |
| 6 | 0.10 | 0.38 | 0.08 | 27.4 | Pass |

TABLE 9

Product consistency results.

| Batch | Product Consistency Rating | Product Consistency Rating (After Baking) |
|---|---|---|
| 1 | 3 | 3 |
| 2 | 3 | 3 |
| 3 | 3 | 3 |
| 4 | 3 | 3 |
| 5 | 3 | 3 |
| 6 | 3 | 3 |

The data in Tables 7, 8, and 9 show that clay substitutes will passivate direct process solids according to the present invention.

Comparative Example 7 and Comparative Example 8

In comparative example 7, 122 g spent bed and 9-10 mL water were mixed. In example 8, 100.34 g of the same spent bed were mixed with 11.18 g bentonite clay and 15.04 g of a 10% lime slurry in water. A self-heating test was performed on both samples. The procedure described above was used, except smaller volume testing baskets (2 inch cubes) and a higher oven temperature (190° C.) were used to compensate for the smaller, lab-scale amount of direct process solids that were produced for testing. This smaller basket test has been shown to give comparable results to the larger basket test described above. The same criteria for self-heating (solids temperature rise of >60° C. above the set oven temperature) was used. This self-heating test was performed, and both of the compositions were self-heating and did not passivate.

Comparative example 7 was run as a control to show the spent bed was active. In comparative example 8, the Clay:DPS ratio was 0.11 and the Base Eq:DPS Ratio was 0.040 to 0.054. The sum was 0.150 to 0.164. Comparative example 8 shows that when the sum of the Clay:DPS ratio and Base Eq:DPS Ratio is less than 0.35, the composition is not passivated and results in a material that is self-heating That which is claimed is:

1. A method of forming a passivated composition, comprising:
combining direct process solids and a passivating composition comprising a clay, water, and a base; where the clay is a hydrated alumino silicate, where the passivating composition contains ≥0.04 equivalents of base per 100 grams of direct process solids, the clay and base are present in amounts such that a sum of a ratio of equivalents of base per 100 g direct process solids plus a ratio of clay to direct process solids is ≥0.35, and the passivated composition comprises at least 60 weight % direct process solids, where the passivated composition formed by the method is non-self-heating.

2. The method of claim 1, wherein the base is combined at ≥0.05 equivalents per 100 grams of the direct process solids.

3. The method of claim 1, wherein the clay is selected from bentonite, kaolin, or diatomite.

4. The method of claim 3 wherein the clay is bentonite.

5. The method of claim 1, wherein the clay and the direct process solids are combined in a ratio and wherein said ratio is of the clay to the direct process solids and said ratio is ≥0.01:1.

6. The method of claim 1, wherein the water is from 10 weight % to 40 weight.

7. The method of claim 6 wherein the water is from 15 weight % to 35 weight %.

8. The method of claim 1, wherein the base is alkali oxide, alkali hydroxide, alkali earth oxide, alkali earth hydroxide, ammonium hydroxide, alkali silicates, alkali earth silicates, alkali borates, or alkali earth borates.

9. The method of claim 8 wherein the base is lime.

10. The method of claim 9 wherein the lime is combined as an aqueous slurry.

11. A process of forming a quenched composition, comprising:
forming a passivated composition according to the process of claim 1, and
holding the passivated composition at ambient temperature until the direct process solids are quenched.

* * * * *